United States Patent
Steinel

(10) Patent No.: US 6,597,287 B1
(45) Date of Patent: Jul. 22, 2003

(54) SENSOR DEVICE AND METHOD FOR OPERATING A SENSOR DEVICE

(75) Inventor: Heinrich Wolfgang Steinel, Bad Wörishofen (DE)

(73) Assignee: Steinel GmbH & Co. KG, Herzebrock (DE)

(*) Notice: Subject to any disclaimer, the term of this patent is extended or adjusted under 35 U.S.C. 154(b) by 0 days.

(21) Appl. No.: 09/647,318

(22) PCT Filed: Apr. 15, 1999

(86) PCT No.: PCT/EP99/02543

§ 371 (c)(1),
(2), (4) Date: Sep. 28, 2000

(87) PCT Pub. No.: WO99/53278

PCT Pub. Date: Oct. 21, 1999

(30) Foreign Application Priority Data

Apr. 15, 1998 (DE) .................................... 198 16 433

(51) Int. Cl.⁷ .............................................. G08B 13/00
(52) U.S. Cl. ................. 340/541; 340/565; 340/567; 340/521; 340/522; 340/511
(58) Field of Search ................. 340/501, 567, 340/541, 565, 521, 522, 511

(56) References Cited

U.S. PATENT DOCUMENTS

| | | | | |
|---|---|---|---|---|
| 4,195,234 A | | 3/1980 | Berman | 340/567 |
| 4,704,533 A | * | 11/1987 | Rose et al. | 250/342 |
| 5,424,717 A | * | 6/1995 | Platt et al. | 340/551 |
| 5,506,567 A | * | 4/1996 | Bichlmaier et al. | 340/555 |
| 5,578,988 A | * | 11/1996 | Hoseit et al. | 340/522 |
| 5,629,676 A | | 5/1997 | Kartoun et al. | 340/567 |
| 6,269,565 B1 | * | 8/2001 | Inbar et al. | 40/361 |

FOREIGN PATENT DOCUMENTS

| | | |
|---|---|---|
| DE | 29705569 | 8/1997 |
| EP | 861164440 | 9/1987 |

* cited by examiner

Primary Examiner—Daniel J. Wu
Assistant Examiner—Daniel Prévil
(74) Attorney, Agent, or Firm—Bachman & LaPointe, P.C.

(57) ABSTRACT

A sensor device, comprising a pyroelectric sensor which is set to operate in daylight, especially an infrared-based motion sensor, and an electronic evaluator. The electronic evaluator is connected downstream of the sensor and is configured to produce a control signal in response to a detector signal from the sensor in relation to a threshold value. The electronic evaluator also has a sensing device for measuring a daylight ambient brightness and a compensating device which is configured to respond to a considerable change in the daylight ambient brightness by modifying the threshold value and/or the detector signal to compensate.

12 Claims, 1 Drawing Sheet

SENSOR DEVICE AND METHOD FOR OPERATING A SENSOR DEVICE

BACKGROUND OF THE INVENTION

The present invention relates to a sensor device, a use and a method of operating such a sensor device.

Sensor devices of the general kind set forth are known from the state of the art, for example from alarm technology, and have a pyrodetector which operates on an infrared basis and which is usually configured as a motion sensor and which outputs a detector signal as a reaction to a significant change in an infrared radiation pattern which is incident on the sensor. Connected downstream of such a sensor device of the general kind set forth there are then suitable consumers, signal units or other functional units to be controlled, for example lighting arrangements, monitoring cameras, alarm installations or the like units.

In addition, so-called sensor lights are known from the state of the art, more specifically motion sensor-controlled light units which—with a correspondingly low level of external ambient brightness—can usually be activated in response to the movement of a person. Sensor lights of that kind also have a passive infrared sensor (PIR) with pyroelectric detector elements; usually however lighting arrangements of that kind are not operated regularly in daylight conditions. As however the pyroelectric detectors generally react exclusively to infrared radiation they are also suitable for motion detection in daylight.

In practical tests however in particular a very bright external ambient condition, that is to say a high level of radiation in the visible ambient light range, has been found to be detrimental in terms of reliable operation of pyroelectric detectors, more specifically in such a way that—in the absence of any motion signal—they trigger off fault switching procedures which, as tests on which the present invention is based have shown, are usually caused by fluctuations in brightness. Common pyroelectric sensors (or pyrosensors or thermopile sensors) generate an evaluatable signal when the amount of radiation which is incident on detection surfaces of the sensor changes; that signal change is evaluated specifically for the purposes of motion detection. To avoid disturbances by such signals which are not caused by the movement of a person or an object, current pyrosensors have a filter which passes only radiation in the relevant infrared spectral ranges (for example between 8 and 14 micrometers); radiation from other spectral ranges—with visible light between about 380 and 760 nanometers—is filtered out by reflection or absorption.

However tests in the context of the present invention have shown that, with very large amounts of radiation being involved, irrespective of the spectral range, the entrance window of the detector, which is in the form of a mass filter, increases slightly in temperature, more specifically due to those radiation components which are not transmitted or reflected. That absorbed heat is then passed to the respective inner or outer surface of the sensor and is there irradiated again from the filter in the form of heat radiation. That can then activate the detector surfaces of the sensor, which is not wanted. While, in the event of very slow changes in the overall irradiation strength, the heat dissipation in the filter and a band pass-form amplification characteristic of the sensors prevent fault switching procedures, a (fault) signal is however produced in particular when the radiation strength changes in a frequency within the band pass, usually between 0.1 and 10 Hz, and so much heat is produced in the filter by correspondingly great changes that an evaluatable signal is produced. As a result the sensor then detects a signal without a movement in the detection region having occurred.

In accordance with the invention it has been found that those troubles occur with brightness fluctuations from about 2000 lux, while in particular with a high level of brightness—solar radiation in the summer time—shadows due to scarcely visible hazy clouds can produce changes of that kind by some 1000 lux, without such changes being perceived for example by a human being.

As however conventional sensor lights are usually operated in the brightness ranges which are below 2000 lux (therefore also use thereof as so-called 'twilight switches'), it was not possible in any case here for any fault switching procedures to occur due to significant fluctuations in brightness.

For effective operation in daylight, which is substantially trouble-free (safeguarded against fault switching procedures) however existing sensor devices are disadvantageous and need improvement and in particular the unintentional sensor activations which are caused by fluctuations in brightness are to be avoided.

SUMMARY OF THE INVENTION

Therefore the object of the present invention is to improve a sensor device of the general kind set forth in regard to its detection and switching characteristics in the event of large absolute changes in ambient brightness and in particular to avoid fault switching procedures which are caused by the brightness involved.

That object is attained by a movement sensor device comprising pyroelectric sensor adjusted to operate in daylight, and an electronic evaluation device connected downstream of the sensor and designed to generate a control signal (S) as a reaction to a detector signal of the sensor relative to a threshold value, wherein the electronic evaluation device comprises means for measuring a daylight-ambient luminosity, and compensating means designed in such a way that they carry out a compensating threshold value change in the threshold value and/or a compensating change in the detector signal as a reaction to a predetermined change in the daylight-ambient luminosity, the electronic evaluation device being designed in such a way that the compensating means only act if a change in the daylight-ambient luminosity is more than 1,000 lux in a band-pass filter-like response range of the sensor.

Advantageously, for the first time means are used for directly measuring the ambient brightness or a change therein and that detected brightness variation is used in order with the compensating means according to the invention to provide dynamic influencing, corresponding to current light conditions, of the switching characteristic of the sensor. In that respect direct measurement of the change in brightness (or the fluctuation in radiation) makes it possible to establish the relationship between the fluctuation in radiation,and the sensor signal (or the change therein as a reaction to the fluctuation in radiation) and to compensate for same by calculation or numerically (that is to say changes in the ambient conditions).

In the specific configuration of the measurement means there is on the one hand the possibility of using a CCD-chip or CMOS-chip—which is in any case possibly present in the context of a use provided with an image pick-up unit—for ascertaining the absolute change in the brightness signal (in the visible spectral range); in that way the brightness signal is available for taking account in accordance with the invention, in a simple manner and without involving additional hardware expenditure.

A possible alternative is that of using an additional pyrodetector which further preferably is modelled on or is a reproduction of the pyroelectric sensor in terms of its detection properties, wherein with that additional pyrodetector the actual useful signal is faded out. That means that the additional pyrodetector measures only the disturbances to the useful signal, caused by other effects to be compensated, as can occur for example due to light, heat or electromagnetic waves (changes in the ambient conditions). In other words, the same type of sensor which is used in accordance with this development as that used for detecting the useful signal is blocked with suitable filter means for the useful signal and therefore serves only to detect the system-governed disturbances which arise out of ambient factors.

As a result it can then be provided that fault switching procedures which for example are due to considerable fluctuations in brightness can be suppressed.

In that respect it is in accordance with the invention, by suitably influencing a switching threshold which influences the switching procedure, to produce the compensation effect and/or to correct a sensor output signal by corresponding brightness-dependent correction values; they may possibly also be present in table form and they can be read out as required.

Independent protection in accordance with the present invention is claimed for a configuration which implements the compensation effect in a manner in accordance with the invention by optical filter means. Those filter means on the one hand reduce the amount of radiation incident on a detector element so that the risk of brightness-caused error switching procedures is eliminated, while on the other hand the filter means according to the invention ensure that the detection range of the useful radiation in the infrared range is independent of a specific angle of incidence on a detector element of the sensor and remains constant over a minimum angular region Thus it is particularly preferred for threshold values or threshold value ranges for producing the control signal to be dynamically increased or reduced with the compensating means; it is further preferred to adjust a current threshold value to an ambient light level.

While light detectors or photodetectors of any kind which permit radiation detection of the specified high levels of brightness and large fluctuations in brightness are suitable for implementation of the invention, it is particularly preferable, for the purposes of brightness measurement, to use the exposure device of a CCD-camera element or the like integrated image pick-up element, which in the context of an overall installation is in any case possibly already connected downstream of the sensor device as a functional unit. A functional unit of that kind with a sensor device of the general kind set forth is to be found in the applicants' German utility model DE 297 05 569 and is to be deemed to be incorporated into the disclosure of the present application in respect of the functional implementation of the functional unit, including the image pick-up unit.

In accordance with the invention, that not only uses the property of the CCD-element of being able to pick up and resolve large fluctuations in brightness, but also such an arrangement renders a separate sensor for detecting interference factors redundant.

In accordance with the independent configuration using optical filter means, they are preferably implemented by means of a removable filter cap which in a further preferred feature is dome-shaped, dome-shaped and/or provided with a portion of hemispherical shape. In an advantageous manner in accordance with the invention, polyethylene has proved itself as the material for such a filter cap, wherein in a further preferred feature that material is provided with a carbon black addition <1%, further preferably <0.5%.

It is also in accordance with the present invention, in a particular development, for the wall thickness of the filter (or the filter cap) to be variable in dependence on angle and preferably to be so designed that a uniform range is achieved in the entire detection region; here in particular in accordance with the design configuration involved the filter thickness is so set that the absorption is greater in the central region and less in the edge region, in each case in relation to the angular region according to the invention.

In a particularly advantageous fashion this optical filter configuration also ensures that existing systems can be retrofitted without any difficulty, more specifically by virtue of the filter means according to the invention being designed to fit on to conventional, commercially available pyrodetectors.

BRIEF DESCRIPTION OF THE DRAWINGS

Further advantages, features and details of the invention will be apparent from the description hereinafter of preferred embodiments with reference to the drawings in which.

DETAILED DESCRIPTION

Figure 1:
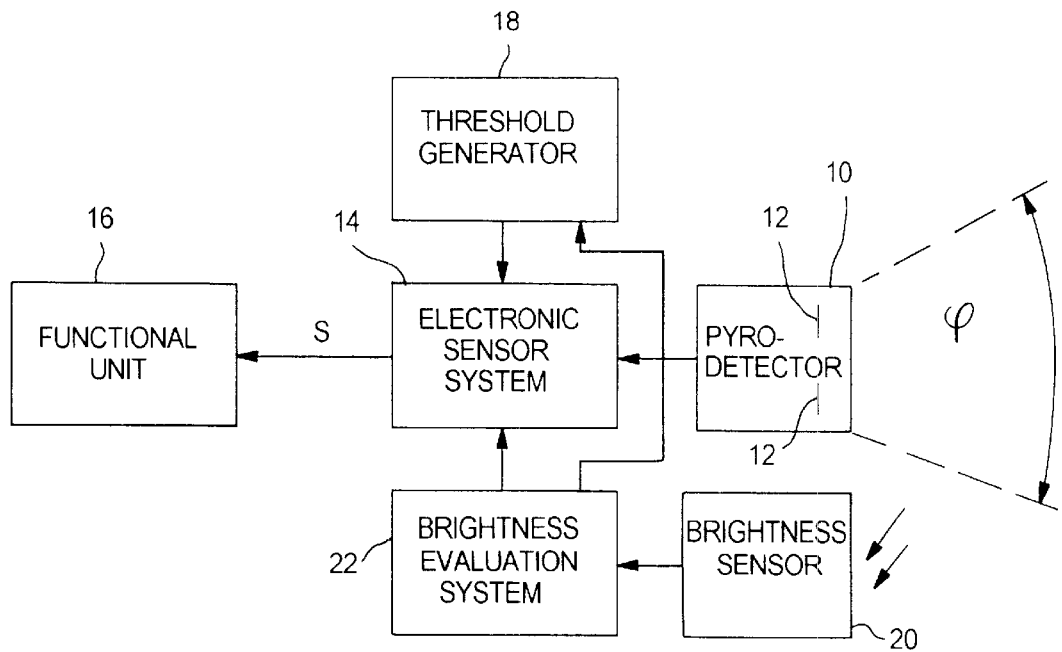
FIG. 1 shows a diagrammatic block circuit diagram of a first preferred embodiment of the invention.

A pyroelectric motion sensor 10 with a detection angle $\phi$ (angle of sight) of usually about 75° has a pair of infrared-sensitive detector elements 12 whose output signal is evaluated in respect of movement in dependence on incident infrared radiation and changes therein, in a manner which is otherwise known.

Connected downstream of the pyrodetector 10 is an electronic sensor system (evaluation unit) 14 which receives the output signal of the pyrodetector 10, evaluates same and, as a result of the evaluation procedure, produces a switching control signal S whereby a downstream-connected functional unit 16, in the illustrated example an alarm device, is activated.

More precisely, the electronic sensor system to produce the switching control signal S compares the pyrodetector output signal to a switching threshold which is produced by a threshold generator 18. In addition, production of the switching signal S also incorporates the result of a brightness measurement procedure in respect of the (daylight) ambient brightness which is implemented by means of a light/brightness sensor 20 and a downstream-connected electronic brightness evaluation system 22. The output signal of the brightness evaluation system then influences the production of the switching signal S in two different ways: on the one hand a detected great change in brightness in the detector 20 provides that a switching threshold is changed or displaced by the generator 18 in a correspondingly great fashion; in addition the detected fluctuation in brightness can be taken into account in the course of signal processing in the electronic system 14, for example in the averaging procedure over a plurality of individual values.

In specific terms the illustrated functional units are thus capable of implementing compensation as follows: on the one hand it is possible to increase the threshold value or values for the switching signal S, in dependence on detected brightness levels or changes in brightness. With a correspondingly high level of ambient light, the sensor would then respond only at a level corresponding to the compensation effect. On the other hand it would be possible to leave the threshold or thresholds constant after the actual useful signal has been ascertained in the electronic system 14, from the two sensors (10, 20). With the latter compensating circuit the sensitivity of the sensor is maintained in regard to the useful signal, even if disturbances occur.

In particular the first method can be easily carried into effect by procedures in particular of digital signal processing, possibly combined with stored setting values; this however still suffers from the disadvantage over the second method that the level of sensor sensitivity decreases with considerable changes in brightness.

In addition it is particularly simple for a change in brightness, in accordance with the present invention, always to be considered relative to the absolute value of the brightness, that is to say for example a detected change in relation to a current absolute value.

While in the embodiment shown in FIG. 1 the fluctuations in brightness could be compensated both by way of influencing the switching threshold (so-called dynamic threshold) or influencing the pyrosensor signal, it will be appreciated that it is also possible to implement compensation with one of both ways.

In practical operation in particular fluctuations in brightness of more than about between 2000 and 10,000 lux are found to be particularly significant; not only do fluctuations in brightness of that kind occur frequently precisely at a high level of ambient light and at a frequency in the response range of the sensor, but also they are often practically not discernible to the human eye—precisely with a high level of ambient light.

In a development of the first embodiment described it is particularly preferred for a functional unit which is to be activated by the sensor device to be combined with its own light or image sensor, as is the case for example with the sensor light produced by the present applicants with incorporated camera module, in accordance with German utility model No 297 05 689. Such an arrangement is intended in particular also for operation in daylight and without compensation in accordance with the present technical teaching would be undesirably activated in a disadvantageous manner by major fluctuations in brightness of the ambient light.

It is particularly advantageous to use the electronic camera system which is already present in any case in order to obtain a brightness value for the above-described compensation effect; more specifically, a camera exposure system or the CCD-/CMOS-unit is advantageously well suited to reliably detect and resolve even large changes in brightness or considerable fluctuations in brightness.

By virtue of integration of the present invention into such a camera light, using ambient light measurement which is already present, that not only reduces additional component expenditure, but in addition operational reliability and therewith also the effective technical benefit from the point of view of a user can be considerably increased.

Figure 2:
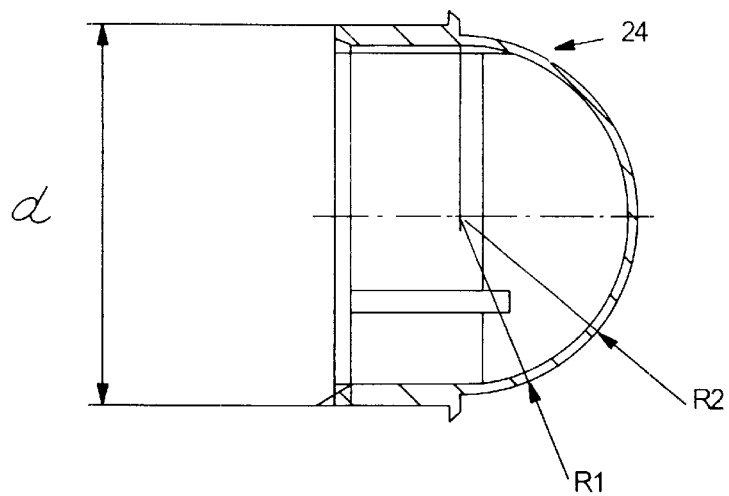
FIG. 2 shows a side view in section of a filter cap in accordance with a second embodiment of the present invention.

With reference to FIG. 2, an alternative embodiment of the present invention is described hereinafter. This embodiment provides that—as an alternative to or in addition to the above-described electronic configuration by means of brightness detection and correction of switching signal production in dependence on a brightness signal—the pyrosensor is provided with a filter cap 24 which can be fitted in place and which can be removed and which is shown in the side view in section in FIG. 2. The cap 24 of a diameter d of about 10 mm is produced from HDPE by an injection molding process and fits on to a housing of the standard TO5. The plastic material is colored; for example carbon black with a proportion by weight <1% is well suited for that purpose.

Previous sensors use in part colored optical systems for reducing the amount of daylight. Then however they cover the brightness sensor contained on the electronic system ('twilight switch') which then functions in a correspondingly worse manner because the faded-out 'disturbance' daylight for that sensor represents the useful signal. Alternatively, but at considerable additional cost, in previous systems the brightness sensor can be spatially separated from the infrared optical system and provided with its own window.

In specific terms, with the illustrated cap of a wall thickness of about 0.3 mm, with a carbon black addition of 0.5%, a reduction in the amount of daylight by a factor of 20 is achieved, while the losses in terms of range due to absorption of the infrared component is only between about 20 and 30%.

A fit-on filter cap of that kind not only enjoys the advantage of being simple and inexpensive to manufacture but in addition it is also suitable for being fitted to or converting existing sensors at very low cost and thus making those existing pyrosensors also suitable for trouble-free daylight operation.

The dome shape due to the cap (radius in the outside region for example 4.2 mm, in the inside region for example 4.5 mm), possibly combined with a variable wall thickness (thinner wall thickness in the edge region, greater wall thickness in the central region of the optical axis) also makes it possible to implement a uniform range in the entire detection area. Such a wall thickness which is proportional to the inverse of the cosine of the respective angle of incidence is then also dependent on the filter characteristic in the spectral signal detection range (for example between 8 and 14 micrometers), a minimum wall thickness which is necessary for strength reasons, a maximum wall thickness and a desired maximum detection angle.

Therefore in the above-described manner using simple means it is possible to suppress influences due to considerable fluctuations in brightness on the mode of operation of pyrosensors.

What is claimed is:

1. Movement sensor device with a pyroelectric sensor adjusted to operate in daylight, and an electronic evaluation device connected downstream of the sensor and designed to generate a control signal (S) as a reaction to a detector signal of the sensor relative to a threshold value, wherein the electronic evaluation device comprises means for measuring a daylight-ambient luminosity, and compensating means designed in such a way that they carry out a compensating threshold value change in the threshold value and/or a compensating change in the detector signal as a reaction to a predetermined change in the daylight-ambient luminosity, the electronic evaluation device being designed in such a way that the compensating means only act if a change in the daylight-ambient luminosity is more than 1,000 lux in a band-pass filter-like response range of the sensor.

2. Device according to claim 1, wherein the compensating means are designed to move a threshold value level or to increase a distance between two threshold values.

3. Device according to claim 1, wherein the compensating means are designed to track at least one threshold value in the direction of a sensor influence by changing the ambient luminosity.

4. Device according to claim 1, wherein the means for measuring comprise a pyroelectric detector which, in terms of its electrical properties, imitates the pyroelectric sensor.

5. Device according to claim 1, wherein the means for measuring are produced by a luminosity detection element of an image detection and transmission apparatus connected to the electronic evaluation device, in particular by a CCD- or CMOS-element or a comparable integrated image receiving element.

6. Device according to claim 1, wherein a sensor light with a light means is activated as a reaction to an output signal of the pyroelectric sensor associated with a light housing, an electronic image detection device designed to cooperate with a wireless image transmission module for an externally receivable image signal generated in an image detection mode being provided with the light housing.

7. Device according to claim 6, wherein the electronic image detection device comprises a CCD camera sensor acting as the means for measuring the daylight-ambient luminosity.

8. Method for operating a sensor device comprising a pyroelectric sensor in daylight, comprising the steps:

detecting a change in the daylight-ambient luminosity;

detecting a sensor detector signal;

changing a switching threshold for a control signal of the sensor device and/or changing the sensor detector signal as a reaction to a detected change in the daylight-ambient luminosity of more than 1,000 lux in a band-pass filter-like response range of the sensor, and generating the control signal as a function of the sensor detector signal and the switching threshold.

9. Movement sensor device with a pyroelectric sensor adjusted to operate in daylight, and an electronic evaluation device connected downstream of the sensor and designed to generate a control signal (S) as a reaction to a detector signal of the sensor relative to a threshold value wherein, optical filter means are placed on a detection region of the sensor, the means being designed in such a way that there is a reduction in the direction region to <10% of the unfiltered radiation, and the filter means are designed in such a way that a damping of the incident radiation in the infrared range over an angular range of at least 65° is independent of an angle of incidence on the sensor, and a loss in range owing to absorption of the infrared fraction is approximately 20 to 30%.

10. Device according to claim 9, wherein the filter means are produced as slip-on, removable filter caps.

11. Device according to claim 10, wherein the filter caps have variable wall thickness for implementing a uniform damping effect over the detection range.

12. Device according to claim 9 or 10, wherein the filter means are produced from polyethylene or a visually similar plastics material.

* * * * *